United States Patent [19]
Icard

[11] 3,737,034
[45] June 5, 1973

[54] LUMBER UNSTACKING APPARATUS

[75] Inventor: Joseph W. Icard, Hudson, N.C.

[73] Assignee: Broyhill Furniture Industries, Lanoir, N.C.

[22] Filed: Oct. 6, 1971

[21] Appl. No.: 186,842

[52] U.S. Cl. ................... 209/84, 271/26 ES, 271/64, 214/8.5 D, 214/309
[51] Int. Cl. ............................................. B07b 13/04
[58] Field of Search .......................... 214/8.5 D, 309; 271/26 ES, 26 R, 34, 64, 74; 209/71, 73, 72, 74, 84, 82

[56] References Cited
UNITED STATES PATENTS

| | | | |
|---|---|---|---|
| 3,391,926 | 7/1968 | Jaatinen | 214/8.5 D |
| 3,599,968 | 12/1969 | Billett | 214/8.5 D |
| 3,463,483 | 8/1969 | Keller et al. | 214/8.5 D |

*Primary Examiner*—Richard A. Schacher
*Assistant Examiner*—Gene A. Church
*Attorney*—Charles R. Rhodes

[57] ABSTRACT

A stack of lumber, including a plurality of alternating layers of boards extending in parallel relationship to each other within the layer and spacer sticks extending in spaced parallel relationship to each other and substantially perpendicular to said boards, is sequentially lifted into engagement with a plurality of elongate vacuum conveyors positioned above the uppermost layer of said stack. The vacuum conveyors, which are arranged between and generally parallel to the sticks, operatively grip the uppermost layer of boards as the remainder of the stack is lowered and transport the uppermost stick layer and board layer in a direction transverse to the boards to a discharge station, during which time a pair of nip rolls automatically separate the sticks from the boards which are sequentially dropped from the ends of the vacuum conveyors. Broken spacer sticks are also automatically separated from unbroken or unusable spacer sticks. The conveyor are flexibly suspended above the stack to insure engagement of each vacuum conveyor with the uppermost layer of boards at points throughout their length.

23 Claims, 5 Drawing Figures

Patented June 5, 1973

INVENTOR.
JOSEPH W. ICARD
BY
Hunt, Rhodes & Thill

INVENTOR.
JOSEPH W. ICARD

Patented June 5, 1973

INVENTOR.
JOSEPH W. ICARD
BY
Hunt, Rhodes & Mills

LUMBER UNSTACKING APPARATUS

BACKGROUND OF THE INVENTION

According to conventional lumber yard practices, lumber is customarily arranged for drying purposes in individual stacks or "hacks," each having a width of approximately 7½ ft., a height of 10 ft., and a length equal to the length of the boards within the stack (varying from 12 to 18 ft.). To provide for air circulation, the planks of each layer of the stack are separated from the planks of the adjacent layers by a plurality of sticks which are placed atop each layer and which extend in spaced parallel relationship to each other at right angles to the planks within the stacks.

Upon the arrival of such a stack of dried lumber at a place of intended use, such as a furniture factory, it must be "broken down" so that the individual planks thereof, which may be bowed or warped, can be fed one at a time to an initial wood-working apparatus such as a rough planar. During the operation of breaking down the stack, the separator-sticks which are unbroken and in reusable condition must be separated or segregated from the broken-separator sticks for collection and eventual return to the lumber yard while those separator-sticks which have become broken must be discarded. In the past these functions have been done manually, however the present apparatus performs them automatically.

SUMMARY OF THE INVENTION

The present invention is directed to an apparatus and method for dehacking a stack of lumber or the like, wherein the stack includes a plurality of layers of boards, the boards in each board-layer extending generally parallel to each other, and the layers being separated by intervening layers of spacer sticks, the sticks in each stick-layer extending generally parallel to each other and at substantially right angles to the boards in the board-layer therebeneath. The apparatus includes a conveyor means for successively separating as a unit each sequentially uppermost board-layer and the stick-layer supported thereon from the remainder of the stack and for transporting such separated layer unit toward a discharge station spaced laterally from the stack and at one end of the conveyor means.

At the discharge station the boards of each layer are sequentially discharged from the aforementioned conveyor means, during which time the sticks of said stick layer are separated therefrom. In addition, the broken sticks are separated from the unbroken sticks and each are collected. The conveyors are flexibly suspended from the support frame to permit limited vertical and/or horizontal movement of the conveyors relative to one another under the impetus of said engagement with said stack, whereby engagement of each vacuum conveyor with the uppermost layer of the boards at points throughout their length is insured.

It is therefore an object of the present invention to provide an apparatus and method for automatically dehacking a stack of lumber of the type including board-layers and intervening stick-layers.

It is another object of the present invention to provide a method and apparatus of the type described wherein means are provided for engaging, holding and separating the uppermost board-layer and stick-layer from the remaining layers of the stack of lumber.

It is yet another object of the present invention to provide a method and apparatus of the type described wherein the stick-layers are separated from the board-layers.

It is still a further object of the present invention to provide a method and apparatus of the type described wherein a series of vacuum conveyors overlie the stack of lumber for sequentially engaging the uppermost board layer for removal therefrom.

It is a further object of the present invention to provide a method and apparatus as described hereinabove, wherein the vacuum conveyors are so mounted as to insure engagement of all vacuum conveyors with the boards of the board layer, irrespective of whether or not they are warped or bowed.

Other objects will become apparent upon further reading of the specification and inspection of the drawings, wherein.

DETAILED DISCLOSURE OF PREFERRED EMBODIMENT

Figure 1:
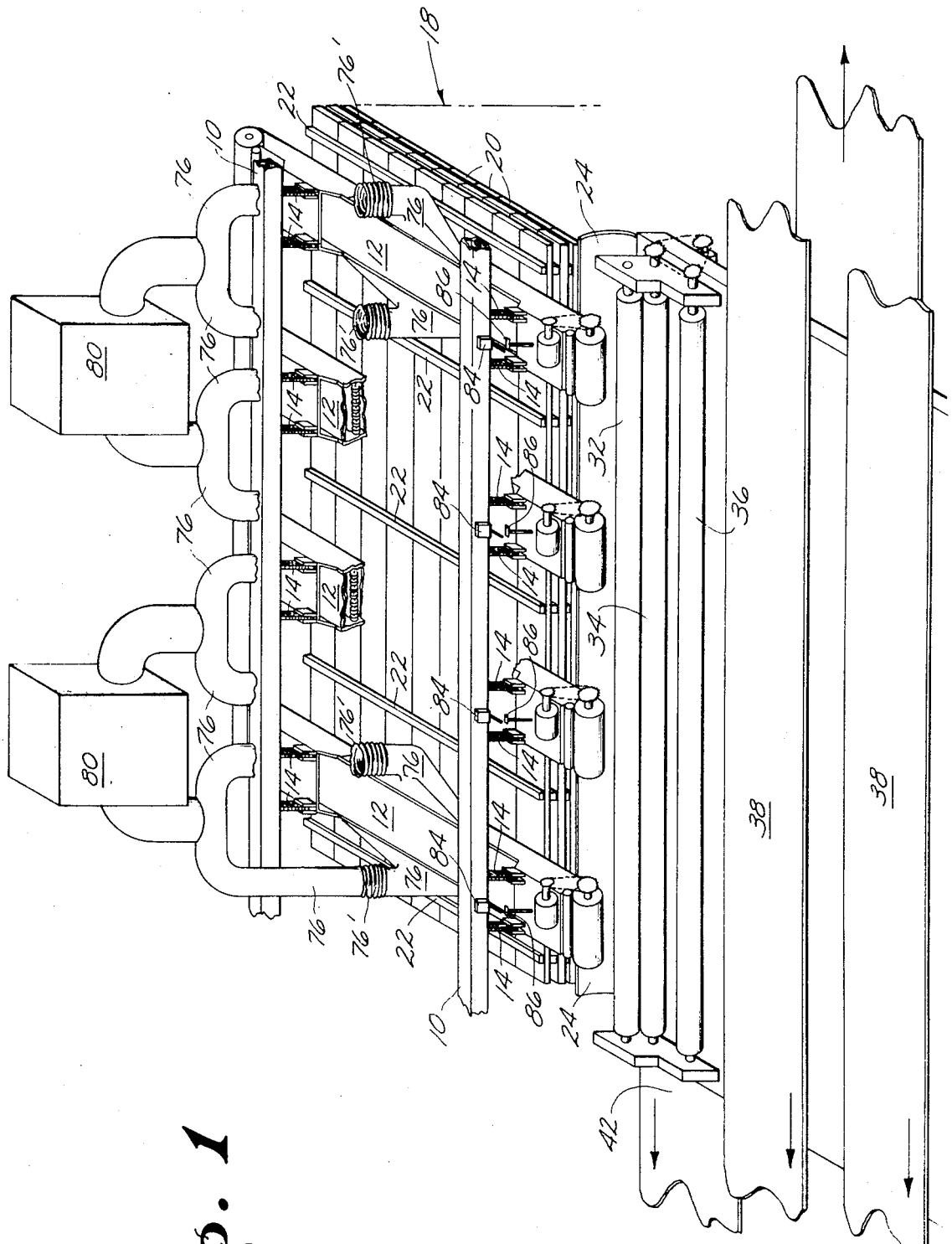
FIG. 1 is a perspective view, with parts broken away for the sake of clarity, illustrating the apparatus according to the present invention, and looking from above toward the front thereof.
Figure 2:
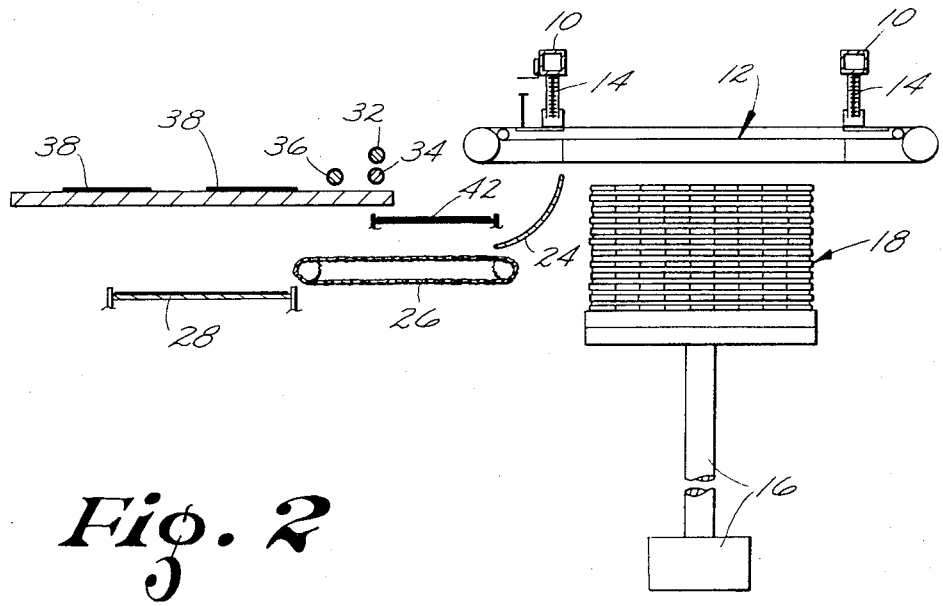
FIG. 2 is a schematic representation of the apparatus according to the present invention, looking from one end thereof.

Referring now to the drawings, and particularly to FIGS. 1-4, there is illustrated a preferred embodiment of the apparatus according to the present invention, which is adapted to dehack a stack 18 of lumber or the like, previously stacked with a plurality of boards 20 extending within each layer in generally parallel relationship to each other, and wherein each board-layer supports an alternating stick-layer of spacer sticks 22, each stick-layer comprising a plurality of sticks 22 extending in generally parallel spaced relationship to each other and at substantially right angles to the boards 20 of the board-layer immediately therebeneath. A conventional lift mechanism 16 supports and alternatively elevates and lowers the stack 18 of lumber vertically into engagement with a conveyor means 12 for separating, as a unit and from the remainder of said stack, each sequentially-uppermost one of said board-layers and the one of said stick-layers supported thereon.

The conveyor means 12 described hereinabove includes four vacuum conveyors 44 suspended by chains 14 in spaced parallel relationship to each other from a pair of horizontal support beams 10, which in turn are part of an upright frame or superstructure (not illustrated). The lift mechanism 16 elevates the stack 18 of lumber vertically upwardly into engagement with the undersurfaces of vacuum conveyors 44, the stack being so oriented that planks 20 thereof extend at right angles to conveyor 44 and the separator-sticks 22 extend parallel to conveyor 44 on opposite sides thereof.

The vacuum conveyor means 12 is adapted to engage the boards of each successively uppermost board-layer of said stack, hold the boards of said board-layer while the lift means 16 is lowered, and transport the boards of said layer transversely of their length to a discharge station, to be later described, where said boards are sequentially released.

The vacuum conveyor means 12 includes a plurality of elongate vacuum conveyors 44 (FIG. 2) extending transversely of the length-direction of the boards within said stack and in laterally spaced and generally parallel relation to one another. Vacuum conveyors are generally known, and the basic construction of the four vacuum conveyors used with the present invention do not form a part of the present invention. By way of background, however, each conveyor 44 includes endless lengths of conventional conveyor apron 44' having spaced holes or slots extending throughout approximately 60 percent of its surface and an overlying layer 44'' of an air pervious material, such as polyurethane foam, adapted to be driven circumferentially around frame 16. Elongate frame 46 includes a pair of spaced parallel side members 48 joined intermediate their height by an air impervious upper plate 50, and adjacent their opposite ends and beneath upper plate 50 by vertical end plates 52, forming a vacuum chamber therewith having an open bottom covered by conveyor apron 44' which is movable in relationship thereto. Apron 44' and its covering 44'' are entrained about main rolls 54, 56 and engaged by guide rolls 58, 60 respectively mounted adjacent the rearward and forward ends of frame 46. One or the other main rolls 54, 56 may be capable of adjustment to vary the tension of apron 44', and an electric motor 62 is mounted on a horizontal cover plate 64, which in turn is attached between side walls 48 at one end of frame 46. A chain and sprocket mechanism 66 operatively connects motor 62 with roll 56 for driving said roll upon energization of motor 62.

The lower edges of side walls 48 include inturned flanges 68 against which the longitudinal edges of the lower flight of apron 44' travel in sealed engagement therewith. A series of shafts 72 support spaced rollers 70 between side walls 48 with the lower edges of rollers 70 coplanar with the lowermost surfaces of inturned flanges 68, whereby the lower flight of apron 44' engages rollers 70 during movement thereby. Each of side walls 48 includes a longitudinal opening 74, and the space beneath frame plate 50 and between frame plates 52 define a suction chamber which communicates through openings 74 and by way of suitable duct work 76 with the inlet of a suction-producing fan or blower 80, suitably attached in the area above frame 10. Duct work 76 includes flexible sections 76' for reasons to be hereinafter described.

Each conveyor 44 is suspended by four chains 14 from support beams 10 of the main frame, and has associated therewith a limit switch 84 attached to one of support beams 10 at a point overlying the conveyor. A plate-type actuator 86 is mounted atop a vertical post 88, which in turn extends upwardly from plate 64 of each conveyor 12 and engages and trips the adjacent limit switch 84 upon upward movement of its conveyor 12 a short distance, approximately 3 or 4 ins. Each switch 84 is connected in series to lift mechanism 16, so that when all switches 84 are closed, the lift mechanism stops, then lowers itself until the stack is clear of the board-layer held by conveyor means 12. Such an arrangement insures that each conveyor is brought into solid engagement with the boards of the uppermost layer prior to the application of the suction lift pressure, regardless of whether the boards are warped or bowed.

As stated earlier, each board layer with its respective stick layer supported thereon is transported to a discharge station at a point spaced from said stack, whereat the boards of said board-layers are sequentially released from the conveyors described hereinabove. Additionally, a separating means, operable during said transportation of the board-layers toward the discharge station, is provided at one end of conveyor means 12 for separating the sticks of the stick-layers from the boards of the board-layers, irrespective of whether the sticks are broken or unbroken. An inclined plate or chute 24 is suitably mounted beneath the discharge ends of vacuum conveyors 44 for directing individual planks 20 released therefrom as the planks are delivered along the conveyor. Upon passage of each board past end wall 52, which defines the end of the suction chamber, the boards are released successively from the conveyor as the apron 44' continues on in its endless path. Chute 24 guides the planks, one by one, onto a lug-type chain conveyor 26, which in turn conveys the planks to another belt conveyor 28 leading to a planing machine (not shown).

A pair of elongate, driven, rubber-covered rolls 32, 34, simultaneously grip the ends of separator-sticks 22 as they are delivered longitudinally of their length direction by the movement of the board layer therebeneath. The sticks 22 are delivered through nip rolls 32, 34 and over feed roll 36 onto belt conveyors 38, which then in turn transport the sticks 22 laterally to a collection station (not shown). Nip rolls 32 and 34 and feed roll 36 are spaced horizontally from the discharge ends of the vacuum conveyors 44 a distance less than the length of unbroken sticks 22, and the nip between rolls 32 and 34 is substantially coplanar with the undersurface of conveyors 44.

An auxiliary belt conveyor 42 (FIG. 2) is disposed beneath the discharge end of vacuum conveyors 44 in the space between such conveyor ends and the rolls 32, 34 for receiving broken sticks 22 which fall thereon, as they are not of substantial length to be received by feed rolls 32, 34. In such a manner, the broken sticks are separated from the unbroken sticks, yet do not fall onto chute 24 or chain conveyor 26, thereby providing additional economies to the system.

In operation, the lift mechanism 16 is alternately raised and lowered relative to vacuum conveying means 12, either manually or automatically, whereby the uppermost layer of stack 18 is successively brought into engagement with the vacuum conveying means 12. It should be obvious, that a modification could be made in such an arrangement whereby the vacuum conveyors 44 are alternately raised and lowered onto the top of a stationary stack, however in the embodiment being herein described, the lift mechanism 16 is preferred. In any event, the stack 18 is lifted relative to the conveyors until its uppermost layer firmly engages the bottom flights of the conveyor apron 44' along conveyors 44. Good engagement is insured, since the upward movement of lift mechanism 16 is continued past the point of first engagement until all conveyors 44 have been raised sufficiently for each respective actuator 86 at least to trip the associated limit switch 84 thereabove. Closing of limit switches 84 causes the lift mechanism 16 to reverse and lower the stack 18 downwardly about 6 ins., then stop. Conveyors 44 return to their normal position holding the uppermost layer of planks 20 2-3 inches above stack 18 in engagement with the conveyor apron 44' due to suction continuously produced within conveyors 44 by fans 80. Conveyor motors 62 are then energized either manually or automatically, which causes the suction-held planks 20 to advance transversely of their length toward the discharge end of conveying means 12. As each plank 20 passes the vacuum-chamber-defining end plate 52 adjacent the discharge ends of conveyor 12, such plank is no longer subject to vacuum forces and therefore is released and falls by gravity onto chute 24, from which it is directed by the lug-type chain conveyor 26 to belt conveyor 28 and thence to planing machine 30. After the last plank is so discharged from conveyor means 12, the lift mechanism is again actuated and the operation repeated until the lumber stack 18 is completely broken down.

With the exception of the initially uppermost layer of planks 20 in each lumber stack 18, each layer of planks 20 supports a stick-layer upon the upper surface thereof, said stick layer extending generally parallel to conveyors 12. As the planks 20 are advanced by conveying mechanism 12 toward the discharge ends thereof, sticks 22 are therefore advanced with the planks in the same direction. Such advancement causes the leading ends of the unbroken sticks 22 to eventually be fed into the nip between rolls 32, 34 which, along with the third and auxiliary feed roll 36, are suitably driven at one end thereof in a direction causing further advancement of the unbroken sticks 22 away from conveyor means 12 and onto belt conveyors 38, which in turn conducts the unbroken sticks 22 away from the apparatus.

It should be noticed that the horizontal distance between the discharge end of conveyor means 12 and the rolls 32, 34 is such that broken sticks topple from the planks 20 before the leading ends of such broken sticks reach the nip between rolls 32, 34. Upon so toppling, the broken sticks are received upon belt conveyors 42 and conducted from the apparatus to a collection point.

Figure 5:
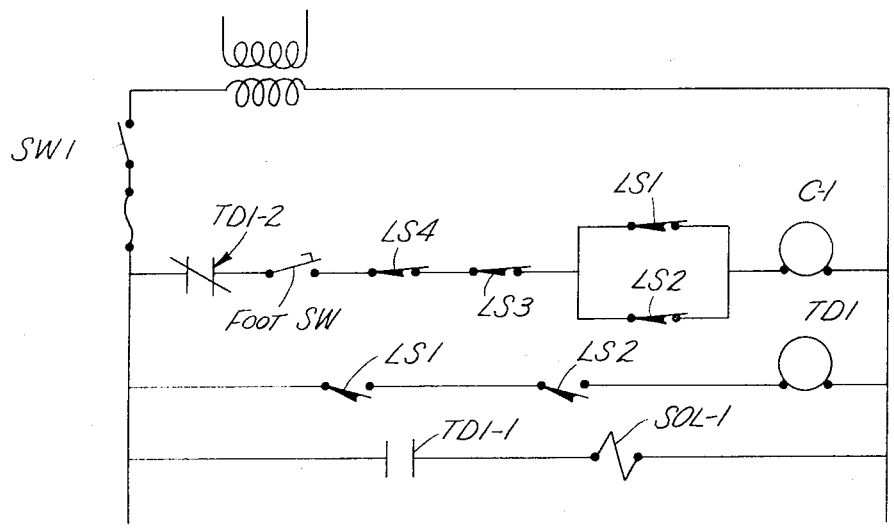
FIG. 5 is an electrical schematic, illustrating the control circuit for the present invention.
Figure 3:
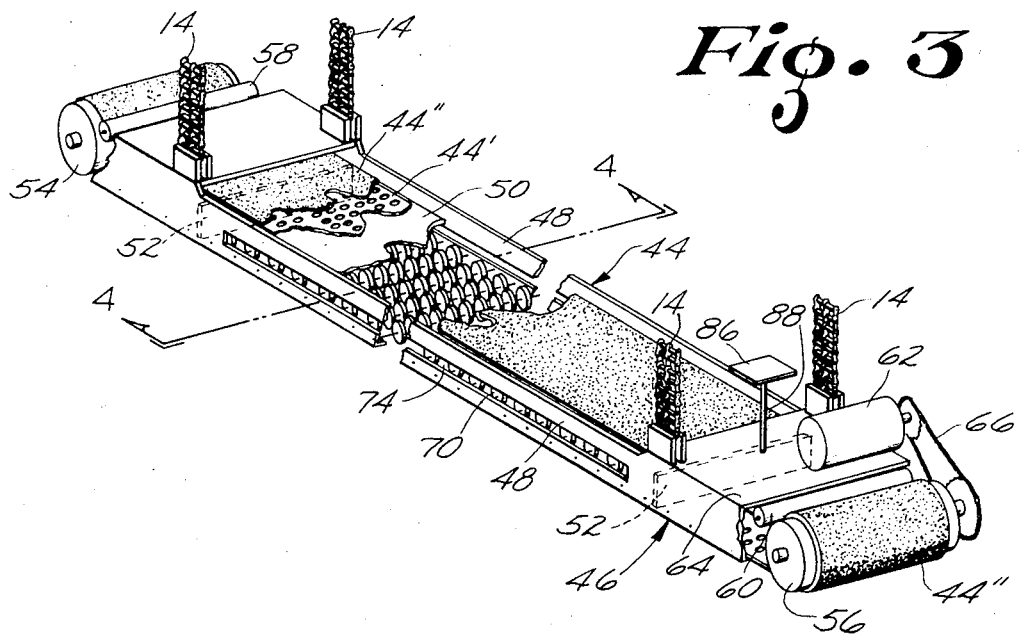
FIG. 3 is an enlarged perspective view, with parts broken away for the sake of clarity, of one of the vacuum conveyors illustrated in FIG. 1.
Figure 4:
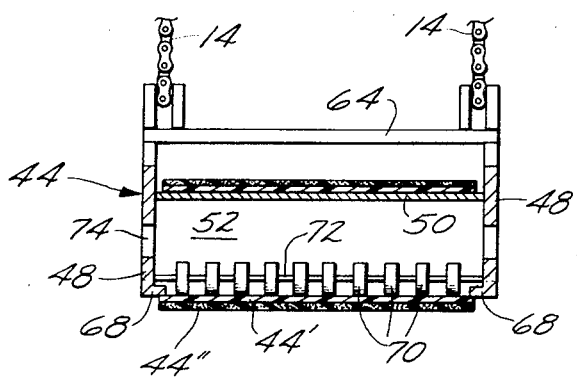
FIG. 4 is an enlarged sectional view taken substantially along line 4—4 of FIG. 3.

The electrical control circuit which operates lift mechanism 16 is illustrated in FIG. 5 and includes four (4) limit switches 84 (identified as LS1, LS2, LS3, and LS4 in the schematic), a time delay TD1, a pump magnetic starter C-1, and a solenoid clamp valve SOL-1. Upon activation of master switch SW-1 and foot switch (FOOT SW), current is caused to flow through the circuit containing normally closed limit switches LS1-LS4 with the result that lift mechanism 16 is activated by starter C-1. When lift mechanism engages limit switches 84, LS1 and LS2 are caused to open shutting down operation of lift mechanism 16. After a prescribed time delay through TD1, time delay TD1-1 operates solenoid SOL-1 for a brief period to lower stack 18 a prescribed distance. Contact TD1-2 is an up-safety interlock. In case of a malfunction this contact prevents station C-1 and SOL-1 from energizing at the same time. After the top layer is removed the cycle is repeated until the unstacking is completed.

It is apparent that other embodiments of this invention may be made without departing from the spirit and scope hereof, and it is to be understood that the invention is not to be limited to the specific embodiment described hereinabove, except as defined in the appended claims.

What is claimed is:

1. Apparatus for de-hacking a stack of lumber or the like, such stack including a plurality of board layers, each layer including a plurality of boards which extend in generally parallel relationship to each other said apparatus comprising:
    a. vacuum conveying means for engaging the boards of each successively uppermost layer of said stack, for gripping said boards and transporting the same transversely of their length to a discharge station whereat the boards are sequentially discharged from said conveying means;
    b. lift means for producing relative movement between said vacuum conveying means and said stack in a generally vertical direction to bring said vacuum conveying means and each successively uppermost layer of said stack into engagement with each other;
    c. said vacuum conveying means including a plurality of elongate vacuum conveyors extending transversely of the length-direction of the boards within said stack and in laterally spaced and generally parallel relationship to one another for engaging each of said boards at a plurality of points, each of said vacuum conveyors being of sufficient length to engage each board in the uppermost layer; and
    d. means mounting said vacuum conveyors for limited vertical movement relative to one another responsive to engagement between said vacuum conveying means and each successively uppermost layer of said stack to insure engagement between each of said conveyors and the boards of said layer.

2. Apparatus as in claim 1, wherein said conveyor mounting means includes a main frame, and flexible means suspending said conveyors from said frame, and wherein said lift means includes a vertically movable platform positioned beneath said conveyors for supporting said stack and for moving the same generally vertically upwardly into engagement with said conveyors.

3. Apparatus as in claim 2, wherein said flexible means mount said conveyors for limited lateral and vertical movement relative to each other and to said main frame.

4. Apparatus as in claim 2, wherein each of said conveyors includes an elongate frame having a vacuum chamber therewithin, roller means mounted for rotation by said frame adjacent the opposite ends thereof, an air-permeable endless apron entrained about said roller means and having a lower flight extending longitudinally of said frame in adjacent operative relationship to said vacuum chamber therewithin, drive means connected to said roller means for, when actuated, moving said lower flight of said endless apron toward an end of said elongate frame adjacent said board discharge station, and further including conveyor-drive control means for actuating and deactuating all of said drive means for said conveyors substantially simultaneously and in unison with one another.

5. Apparatus as in claim 1, wherein said stack further includes intervening layers of spacer sticks between adjacent ones of said layers of boards, each of said layers of spacer sticks being supported upon an underlying one of said layers of boards and the spacer sticks within each of said layers thereof extending in spaced and generally parallel relationship to each other and substantially perpendicularly to said boards, and wherein said apparatus further includes means for separating said spacer sticks from said boards during dehacking of said stack.

6. Apparatus as in claim 5, wherein said separating means further separates unbroken ones from broken ones of said sticks, and includes first and second stick-conveying means adjacent said board discharge station for respectively receiving and transporting unbroken ones and broken ones of said sticks.

7. Apparatus for dehacking a stack of lumber or the like, said stack including layers of boards supporting alternating layers of spacer sticks, the boards within each of said board layers extending in generally parallel relationship to each other and at substantially right angles to the sticks of the one of said stick-layers supported thereon, and the sticks within each of said stick-layers extending in generally parallel spaced relationship to each other at substantially right angles to the boards of the one of said board-layers supporting the same, said apparatus comprising:
a. first means for separating, as a unit and from the remainder of stack stack, each sequentially-uppermost one of said board-layers and the one of said stick-layers supported thereon and for transporting said separated layers toward a discharge station, spaced laterally from said stack, whereat the boards of said board-layers are discharged from said first separating means;
b. and second means, operable during said transportation of said layers toward said discharge station, for separating sticks of said stick-layer from the boards of said board-layer.

8. Apparatus as in claim 7, wherein said second means includes feed-roll means having a stick-receiving nip aligned with and adapted to receive sticks of said stick-layer during said transporting thereof by said first means.

9. Apparatus as in claim 8, wherein said feed-roll means is laterally spaced from said board discharge station a distance such as to receive only unbroken ones of said sticks within said nip thereof, whereby said second means is further adapted to separate unbroken ones from broken ones of said sticks of said stick-layer.

10. Apparatus as in claim 9, wherein said second means further includes broken-stick collecting means located intermediate said board discharge station and said feed-roll means for receiving broken ones of said sticks of said stick-layer.

11. Apparatus as in claim 7, wherein said first means includes a plurality of elongate vacuum conveyors extending generally horizontally in spaced and substantially parallel relationship to each other and in substantially transverse relation to the length dimension of the boards in said stack, said vacuum conveyors being adapted to grippingly engage each sequentially-uppermost one of said board-layers of said stacks and being so oriented relative to said stack as to extend during said engagement in horizontally spaced and substantially parallel relationship to the sticks of the one of said stick-layers supported upon said board-layer.

12. Apparatus as in claim 11, wherein said first means further includes lift means for moving said stack generally vertically to bring each successively-uppermost board-layer thereof into engagement with said conveyors.

13. Apparatus as in claim 12, including a main frame, and flexible means suspending said conveyors from said main frame for limited vertical movement relative to one another under the impetus of said engagement with said stack.

14. Apparatus as in claim 7, wherein said first means includes a plurality of elongate vacuum conveyors, and means mounting said conveyors in laterally spaced and substantially parallel relationship for limited independent movement relative to each other.

15. Apparatus as in claim 14, wherein said first means further includes lift means for producing relative movement between said vacuum conveyors and said stack to bring said vacuum conveyors and each successively-uppermost board-layer of said stack into engagement with each other, and control means for said lift means including a plurality of switch elements responsive to said limited independent movement of said conveyors.

16. A method of dehacking a stack of lumber or the like, said stack including layers of boards supporting alternating layers of spacer sticks, the boards within each of said board-layers extending in generally parallel relationship to each other and at substantially right angles to the sticks of the one of said stick-layers supported thereon, and the sticks within each of said stick-layers extending in generally spaced relationship to each other at substantially right angles to the boards of the one of said board-layers supporting the same, comprising the steps of:
a. separating, as a unit and from the remainder of said stack, each sequentially-uppermost one of said board-layers and the one of said stick-layers supported thereon;
b. and transporting said separated layers toward a board-discharge station and discharging the boards of said board-layer thereat.

17. A method as in claim 16, wherein the boards of said board-layer are discharged one at a time and in sequence at said discharge station.

18. A method as in claim 16, wherein the step of separating said layers from the remainder of said stack includes the step of gripping upper surface areas of the boards of each sequentially-uppermost one of said board-layers.

19. A method as in claim 18, wherein the gripping of said boards is along upper surface areas thereof intermediate sticks of said stick-layer supported upon said board-layer.

20. A method as in claim 16, wherein the step of separating said layers from the remainder of said stack includes the steps of positioning the stack beneath a plurality of gripping means suspended thereabove for limited vertical movement, to and from a normal elevation, relative to one another, moving the stack upwardly to and beyond said normal elevation of said gripping means to cause gripping engagement between each of said gripping means and the boards of the sequentially-uppermost one of said board-layers, and thereafter lowering the remainder of said stack downwardly beneath said elevation and beneath the one of said board-layers gripped by said gripping means.

21. A method as in claim 20, wherein said gripping means comprises a plurality of elongate vacuum conveyors extending generally horizontally in spaced and substantially parallel relationship to each other, and wherein the stack is positioned beneath said vacuum conveyors with the sticks of said stick-layers extending in horizontally spaced and generally parallel relationship to said vacuum conveyors.

22. A method as in claim 16, and further including the step of separating the sticks of said stick-layer from the boards of said board-layer during the transporting of said layers toward said board-discharge station.

23. A method as in claim 22, including separating unbroken ones of said sticks from broken ones of said sticks during the separating of the sticks of said stick-layer from the boards of said board-layer.

* * * * *